United States Patent
Raddant

(10) Patent No.: US 6,819,294 B2
(45) Date of Patent: Nov. 16, 2004

(54) VEHICLE ANTENNA DEVICE

(75) Inventor: Hans-Joachim Raddant, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,629

(22) PCT Filed: Sep. 6, 2001

(86) PCT No.: PCT/DE01/03421

§ 371 (c)(1),
(2), (4) Date: Aug. 20, 2003

(87) PCT Pub. No.: WO02/21634

PCT Pub. Date: Mar. 14, 2002

(65) Prior Publication Data

US 2004/0021609 A1 Feb. 5, 2004

(30) Foreign Application Priority Data

Sep. 6, 2000 (DE) .......................................... 100 43 757

(51) Int. Cl.⁷ .............................................. H01Q 1/32
(52) U.S. Cl. ........................ 343/713; 343/712; 343/711
(58) Field of Search ................................ 343/713, 711, 343/712, 872, 906

(56) References Cited

U.S. PATENT DOCUMENTS

| | | | | |
|---|---|---|---|---|
| 4,845,505 A | * | 7/1989 | Ohe et al. ................... | 343/712 |
| 4,968,984 A | | 11/1990 | Katoh et al. ................ | 343/713 |
| 5,682,168 A | * | 10/1997 | James et al. ................ | 343/713 |
| 5,926,142 A | * | 7/1999 | Rathgeb et al. ............. | 343/713 |

FOREIGN PATENT DOCUMENTS

| | | |
|---|---|---|
| DE | 196 36 477 | 3/1998 |
| EP | 0 221 694 | 5/1987 |
| EP | 0 994 525 | 4/2000 |
| FR | 2 742 584 | 6/1997 |

* cited by examiner

Primary Examiner—Shih-Chao Chen
Assistant Examiner—Ephrem Alemu
(74) Attorney, Agent, or Firm—Kenyon & Kenyon

(57) ABSTRACT

A vehicle antenna device ensures effective protection of a vehicle antenna from electrostatic discharges in a wheel bearing of the motor vehicle. The vehicle antenna device includes an electrically conducting structure which acts as an antenna in a fender which is separated from the vehicle interior by an electrically conductive body panel and is made of an electrically nonconducting material in the area of the structure. A shielding wall made of an electrically conductive material is provided, this wall being electrically conductively connected to the body panel and being situated between a wheel bearing and the electrically conducting structure.

2 Claims, 1 Drawing Sheet

VEHICLE ANTENNA DEVICE

BACKGROUND INFORMATION

German Patent Application No. 196 36 477 has already described a vehicle antenna device which includes a conducting structure acting as an antenna in a fender made of a nonconducting material and separated from the interior of the vehicle by a body panel.

SUMMARY OF THE INVENTION

The vehicle antenna device according to the present invention has the advantage over the related art that a shielding wall made of an electrically conductive material is provided, is electrically conductively connected to the body panel, and is situated between a wheel bearing and the electrically conducting structure. Consequently, electrostatic discharges from the wheel bearing do not cause interference in the antenna signal received by the structure. The structure is effectively shielded by this shielding wall from such electrostatic discharges from the wheel bearing.

It is especially advantageous that the shielding wall is formed by a splash guard wall situated above the wheel assigned to the wheel bearing, the electrically conducting structure being situated on the side of the splash guard wall facing away from the wheel and insulated from it electrically. In this way, a splash guard wall, which is provided anyway to protect the fender from weathering influences, may also be used at the same time to shield the structure due to the metallic design, which is electrically conducting, so that no additional material or production complexity is required for shielding the structure and thus no additional costs are incurred.

Another advantage is that the splash guard wall develops into an external, electrically conductive fender part which at least partially covers the wheel, and on its side facing the body panel the fender is made of an electrically nonconducting material, and above the splash guard wall and the outer fender part, it forms a cavity in which the structure is situated. This improves the shielding of the structure, because the shielding wall is continued by the external fender part, so that the external fender part also contributes toward shielding of the structure from electrostatic discharges of the wheel bearing.

DETAILED DESCRIPTION

Figure 1:
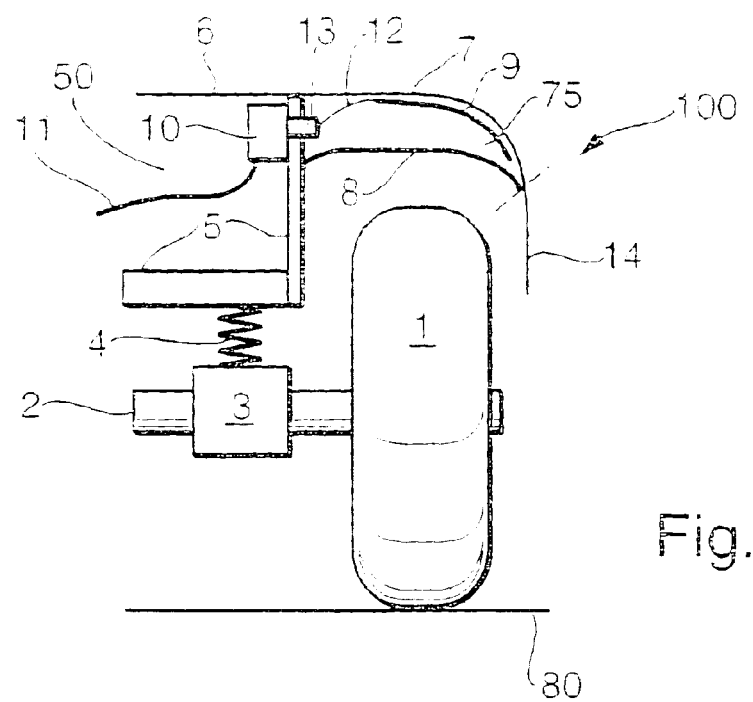
FIG. 1 shows a first exemplary embodiment of a vehicle antenna device according to the present invention.

FIG. 1 shows a vehicle antenna device 100. A wheel bearing 3 is mounted on a body panel 5 of a motor vehicle via a spring leg 4. An axle 2 runs in wheel bearing 3 with a wheel 1 mounted on it. Electrostatic discharges occur in wheel bearing 3 in particular in the rotation of axle 2 in wheel bearing 3 to move wheel 1. While spring leg 4 having wheel bearing 3 is situated on the side of body panel 5 facing road surface 80, body panel 5 on the side facing away from road surface 80 supports a fender 7, 14 covering wheel 1 at the top as well as a wall cover 6, e.g., a trunk which develops out of fender 7, 14. According to FIG. 1, fender 7, 14 includes two parts, as indicated by the dotted line in FIG. 1. A first part 7 of fender 7, 14 is formed by its side facing body panel 5 and forms an upper cover on wheel 1. A second or outer fender part 14 forms a lateral cover for wheel 1 in continuation of first part 7 of fender 7, 14. In the embodiment according to FIG. 1, both first part 7 and second part 14 of fender 7, 14 are made of an electrically nonconducting material.

According to FIG. 1, an electrically conducting structure 9 which functions as a vehicle antenna is situated on the side of first part 7 of fender 7, 14 facing wheel 1. Structure 9 may be mounted on first part 7 via an insulating body, for example. Structure 9 is connected to a module 10 on the side of body panel 5 facing vehicle interior 50 through a sealing bushing 13 through body panel 5 by a connecting wire 12. Module 10 may contain one or more passive adaptation circuits or antenna amplifiers, depending on requirements. From module 10, the antenna signal received by structure 9 and adapted and/or amplified in module 10 is relayed via an antenna cable 11 to a receiver.

According to FIG. 1, a shielding wall 8 made of an electrically conductive material is also provided, electrically conductively connected to body panel 5 and situated between wheel 1, and thus also wheel bearing 3, and electrically conducting structure 9. Shielding wall 8 in this way shields structure 9 from electrostatic discharges in wheel bearing 3 and thus prevents corresponding interference in the antenna signal received by structure 9.

Shielding wall 8 together with first part 7 of fender 7, 14 forms a cavity in which structure 9 is situated on the side of shielding wall 8 facing away from wheel 1 and insulated from it electrically. The cavity thus formed is separated from the interior of the vehicle by body panel 5. Shielding wall 8 may at the same time function as a splash guard wall, and due to its arrangement above wheel 1 assigned to wheel bearing 3, it protects the cavity thus formed with structure 9, connecting wire 12, sealing bushing 13, and first part 7 of fender 7, 14 from weathering influences and especially from moisture, which is picked up from road surface 80 by wheel 1. This also prevents water from penetrating into amplifier 10 through sealing bushing 13.

Figure 2:
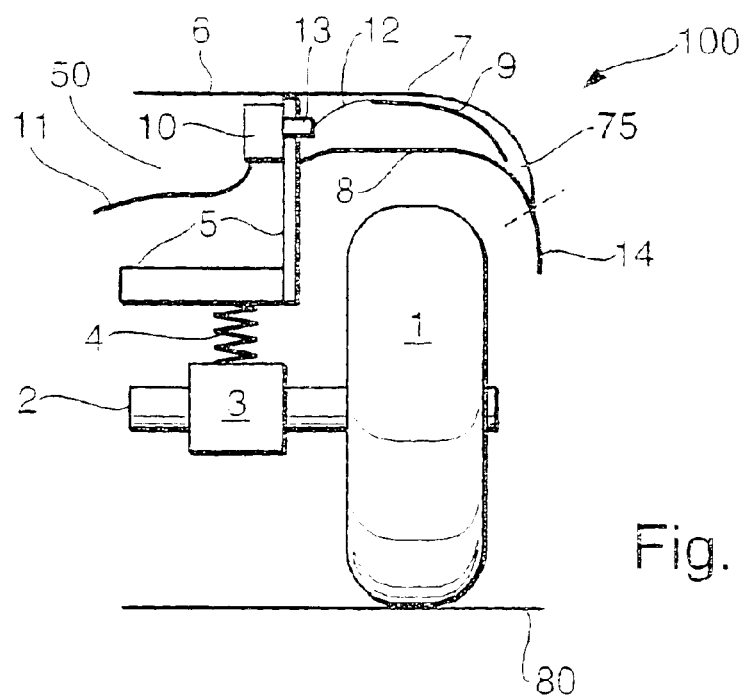
FIG. 2 shows a second exemplary embodiment of a vehicle antenna device according to the present invention.

An even better shielding effect is achieved according to another exemplary embodiment according to FIG. 2 in which the same reference numbers characterize the same elements as in FIG. 1. The second embodiment according to FIG. 2 corresponds to the first embodiment according to FIG. 1, except that second part 14 of fender 7, 14 is now made of an electrically conductive material, whereas first part 7 of fender 7, 14 is still made of an electrically nonconducting material. Thus, second part 14 of fender 7, 14, as shown in FIG. 2, may directly continue the shielding wall, i.e., splash guard wall 8, and may be designed in one piece with it. In this way, second part 14 of fender 7, 14 also contributes toward the shielding effect, which is further improved because of the at least partial lateral coverage of wheel 1 by second part 14 of fender 7, 14. Shielding wall 8 is further shifted in the direction of road surface 80 by second part 14 of fender 7, 14, so that the part above it is shielded even better from electrostatic discharges in wheel bearing 3. Above shielding wall 8 and the second part, i.e., outer part 14 of fender 7, 14, there is still a cavity in which structure 9 is situated in the manner described above. The cavity in both figures is labeled with reference number 75.

Electrically conductive parts such as body panel 5, shielding wall 8, and second part 14 of fender 7, 14 according to the second embodiment shown in FIG. 2 may be made of metal, whereas electrically nonconducting parts such as first part 7 of fender 7, 14 may be made of plastic.

What is claimed is:

1. A vehicle antenna device comprising:

an electrically conducting structure acting as an antenna in a fender of a vehicle which is separated from an interior of the vehicle by an electrically conductive body panel, the fender being composed of an electrically non-conducting material in an area of the electrically conducting structure; and a shielding wall composed of an electrically conductive material, the shielding wall being electrically conductively connected to the body panel and being situated between a wheel bearing of the vehicle and the electrically conducting structure, the shielding wall being formed by a splash guard wall situated above a wheel of the vehicle corresponding to the wheel bearing, wherein the electrically conducting structure is situated an a side of the splash guard wall facing away from the wheel and is electrically insulated from the splash guard wall.

2. The vehicle antenna device according to claim 1, wherein the splash guard wall develops into an external, electrically conductive fender part which at least partially covers the wheel, and on a side facing the body panel, the fender is composed of an electrically non-conducting material, and, above the splash guard wall and the external fender part a cavity is defined in which the electrically conducting structure is situated.

* * * * *